QUADRUPLE-BALANCE MIXER
Filed Oct. 24, 1967
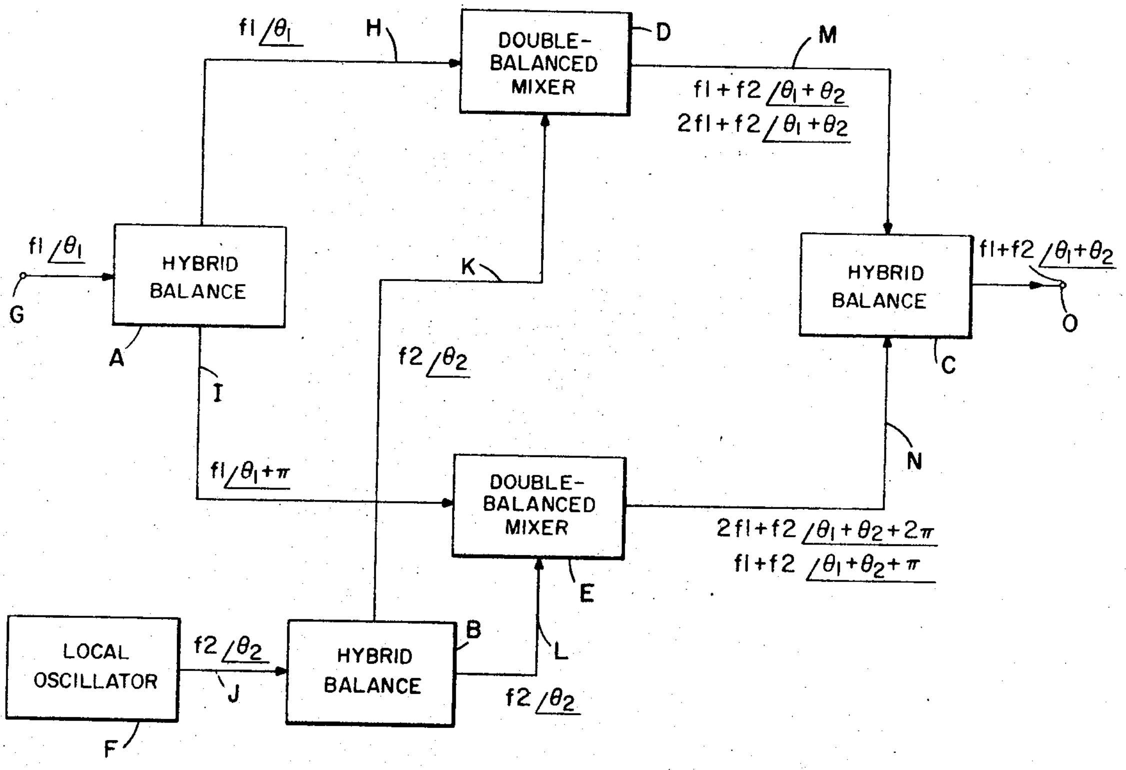
Robert H. Merriam,
INVENTOR.
BY Harry M. Saragovitz
Edward J. Kelly
Herbert Berl
Aubrey J. Dunn United States Patent Office 3,515,993

Patented June 2, 1970

3,515,993

QUADRUPLE-BALANCE MIXER

Robert H. Merriam, North Syracuse, N.Y., assignor, by mesne assignments, to the United States of America as represented by the Secretary of the Army Filed Oct. 24, 1967, Ser. No. 677,800
Int. Cl. H04b *1/26*
U.S. Cl. 325—446 5 Claims

ABSTRACT OF THE DISCLOSURE

A signal to be mixed is applied to a non-conjugate leg of a first hybrid balance, and a local oscillator output is applied to a non-conjugate leg of a second hybrid balance. A conjugate leg of each said balances is connected to a respective input of a first double-balanced mixer, and the other conjugate leg of each of said balances is connected to another respective input of a second double-balance mixer. The outputs of the mixers are applied to the conjugate legs of a third hybrid, and a non-conjugate leg of the third hybrid provides the quadruple-balanced output.

BACKGROUND OF THE INVENTION

This invention is in the field of electronic frequency mixers. The usual type of mixer is a single ended affair, and suffers from spurious outputs generated by even order signal multiples and from local-oscillator noise in the IF signals. Balanced mixers are known, and utilize two separate mixer units driven in shunt by the local-oscillator signal and in push-pull by the received signal, or vice versa. Double-balanced mixers are also known. In critical applications the reduction in spurious intermodulation products and local-oscillator noise afforded by balanced and double-balanced mixers is insufficient. The invention allows another order of reduction intermodulation products and of local-oscillator noise in the IF signal.

SUMMARY OF THE INVENTION

This invention is a quadruple-balanced mixer made by the novel combination of hybrid balances and double-balanced mixers. Two hybrid balances respectively have the local oscillator and the signal waves applied thereto, one balance provides phase-displaced outputs and the other provides in-phase outputs. Two double-balanced mixers are provided, and respective outputs from each balance is applied to respective inputs of the mixers. The outputs of the mixers are combined in a third hybrid balance, and the output of this third balance is the IF signal output of the inventive device. An increase in the reduction of intermodulation products and local-oscillator noise in the IF signals is realized.

An object of th einvention is to provide a novel electronic mixer.

Another object is to provide a quadruple-balanced mixer.

Yet another object is to provide a quadruple-balanced mixer using a novel combination of hybrid balances and double-balanced mixers.

BRIEF DESCRIPTION OF THE DRAWING

The single figure of drawing is a schematic drawing of the circuit of the invention.

DESCRIPTION OF THE PREFERRED EMBODIMENT

Referring to the drawing, the invention is a circuit including three hybrid balances, respectively designated A, B, and C, two double-balanced mixers, respectively designated D and E, and a local oscillator, designated F. Each of balances A, B, and C is known in the art, as are mixers D and E. Signals to be converted (mixed) by the invention are applied to terminal G. Balance A provides two outputs, on lines H and I respectively, which outputs are 180° phase-displaced with each other, in the known manner. The output of local oscillator F connects to the input of balance B. Outputs are provided on respective lines from balance B, in phase with each other. Output H of balance A and output K from balance B are combined in double-balanced mixer D, and outputs I from balance A and output L from balance B are combined in mixer E. Respective outputs M and N from mixers D and E, which are now 180° phase-displaced from each other, are combined in the 180° phase-displaced arms of balance C, providing an IF signal at terminal O.

Typical frequencies which may occur in the invention are shown for the various interconnecting lines of the drawing. Signal frequency $$f1\underline{/\theta_1}$$

may be applied to terminal G, and local oscillator frequency $$f2\underline{/\theta_2}$$

to line J. Balance A provides as outputs:

$$F1\underline{/\theta_1} \text{ and } f1\underline{/\theta_1+\pi}$$

and balance B provides as outputs:

$$f2\underline{/\theta_2} \text{ and } f2\underline{/\theta_2}$$

wherein $\pi$ would ordinarily be 180°

The frequencies applied to mixer D allow the following outputs for D:

$$f1+f2\underline{/\theta_1+\theta_2}, \text{ and } 2f1+f2\underline{/\theta_1+\theta_2}$$

Mixer E provides these outputs:

$$2f1+f2\underline{/\theta_1+\theta_2+2\pi} \text{ and } f1+f2\underline{/\theta_1+\theta_2+\pi}$$

Balance C provides the following output:

$$f1+f2\underline{/\theta_1+\theta_2}$$

Inputs $$2f1+f2\underline{/\theta_1+\theta_2}$$

and $$2f1+f2\underline{/\theta_1+\theta_2+\pi}$$

are subtracted in balance C and only their difference appears at output O. It can thus be seen that quadruple mixing of frequencies $f1$ and $f2$ is accomplished.

Balances A, B, and C may take several forms, dependent upon the frequencies being employed. For microwave frequencies, hybrid junctions or Magic-T's may be employed, while transformer balances may be used for lower frequencies. Double-balance mixers D and E may also vary to correspond the frequencies employed, with waveguide mixers for microwave frequencies.

While a specific embodiment of the invention has been shown and described, other embodiments may be obvious to one skilled in the art, in light of this disclosure. The invention should be limited in scope only by the attached claims.

I claim:

1. A quadruple-balanced mixer including a first hybrid balance having an input and first and second outputs, with a first frequency applied to said input; a second hybrid balance having an input and first and second outputs, with a second frequency applied to said input of said second balance; first and second doubly balanced mixers each having first and second inputs and each having an output; the first output of each of said balances connected to each first input of each of said doubly balanced mixers, the second output of each of said balances connected to each second input of said doubly balanced mixers; a third hybrid balance having first and second inputs and an output, with said outputs of said first and second doubly balanced mixers respectively connected to said first and second inputs of said third balance.

2. The mixer as defined in claim 1 wherein said hybrid balances are hybrid junctions.

3. The mixer as defined in claim 1 wherein said hybrid balances are Magic-T's.

4. The mixer as defined in claim 1 wherein said inputs to said first and second balances are non-conjugate legs of said balances, and said inputs to said third balance are conjugate legs of said balance.

5. The mixer as defined in claim 3 wherein inputs to said first and second balances are non-conjugate legs of Magic-T's, and said inputs to said third balance are conjugate legs of Magic-Ts.

References Cited

UNITED STATES PATENTS

| | | | |
|---|---|---|---|
| 2,436,828 | 3/1948 | Ring | 325—446 |
| 2,563,591 | 8/1951 | Edwards | 325—446 |
| 2,568,090 | 9/1951 | Riblet | 325—446 |
| 3,159,790 | 12/1964 | Pratt | 325—442 |

ROBERT L. GRIFFIN, Primary Examiner

A. J. MAYER, Assistant Examiner